(12) United States Patent
Kashyap

(10) Patent No.: US 7,903,543 B2
(45) Date of Patent: Mar. 8, 2011

(54) METHOD, APPARATUS AND PROGRAM STORAGE DEVICE FOR PROVIDING MUTUAL FAILOVER AND LOAD-BALANCING BETWEEN INTERFACES IN A NETWORK

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 12/274,450

(22) Filed: Nov. 20, 2008

(65) Prior Publication Data

US 2009/0073875 A1    Mar. 19, 2009

Related U.S. Application Data

(63) Continuation of application No. 11/047,999, filed on Jan. 31, 2005, now Pat. No. 7,505,401.

(51) Int. Cl.
*G01R 31/08* (2006.01)
(52) U.S. Cl. .......................... 370/217; 370/225
(58) Field of Classification Search .................. None
See application file for complete search history.

(56) References Cited

U.S. PATENT DOCUMENTS

| | | | |
|---|---|---|---|
| 6,067,545 A | 5/2000 | Wolff | |
| 6,253,334 B1 | 6/2001 | Amdahi et al. | |
| 6,314,525 B1 | 11/2001 | Mahalingham et al. | |
| 6,393,483 B1 | 5/2002 | Latif et al. | |
| 6,490,632 B1 | 12/2002 | Vepa et al. | |
| 6,560,630 B1 | 5/2003 | Vepa et al. | |
| 6,687,245 B2 | 2/2004 | Fangman et al. | |
| 6,714,549 B1 | 3/2004 | Phaltankar | |
| 6,728,780 B1* | 4/2004 | Hebert | 709/239 |
| 6,944,785 B2* | 9/2005 | Gadir et al. | 714/4 |
| 7,287,186 B2 | 10/2007 | McCrory et al. | |
| 7,296,069 B2 | 11/2007 | Nguyen | |
| 7,382,790 B2 | 6/2008 | Warren et al. | |
| 7,423,962 B2 | 9/2008 | Auterinen | |
| 7,583,665 B1* | 9/2009 | Duncan et al. | 370/389 |
| 2001/0056503 A1* | 12/2001 | Hibbard | 709/250 |
| 2002/0052942 A1 | 5/2002 | Swildens et al. | |
| 2005/0281191 A1 | 12/2005 | McGee et al. | |
| 2006/0039384 A1 | 2/2006 | Dontu et al. | |
| 2006/0168192 A1 | 7/2006 | Sharma et al. | |

OTHER PUBLICATIONS

Murray D. G., "Using IBM Local Area Network Server to Support Redundant Resources and Balance Licenses," IBM Technical Disclosure Bulletin, vol. 40 No. 4, Apr. 1997, pp. 183-185.
Ge J et al., "Cluster-Based Virtual Router," 2001 International Conferences on Info-tech and Info-net, Proceedings, (Cat. No. 01EX479), vol. 2 pp. 102-109.

* cited by examiner

*Primary Examiner* — Phirin Sam
(74) *Attorney, Agent, or Firm* — Lieberman & Brandsdorfer, LLC

(57) ABSTRACT

A method, apparatus and program storage device for providing mutual failover and load-balancing between interfaces in a network is disclosed. An active virtual interface and a passive virtual interface are provided for each of a first and a second computer interface. The active virtual interface of the first computer interface is communicatively coupled with the passive virtual interface of the second interface. The active virtual interface of the second computer interface is communicatively coupled with the passive virtual interface of the first computer interface. Data flow is directed over each of the first computer interface-active virtual interface and second computer interface active virtual interface when the first and second computer interface is available, else data flow is directed to the active virtual interface and passive virtual interface of an available first or second interface.

20 Claims, 5 Drawing Sheets

METHOD, APPARATUS AND PROGRAM STORAGE DEVICE FOR PROVIDING MUTUAL FAILOVER AND LOAD-BALANCING BETWEEN INTERFACES IN A NETWORK

CROSS REFERENCE TO RELATED APPLICATION(S)

This application is a continuation of application Ser. No. 11/047,999, filed on Jan. 31, 2005, now pending, which is hereby incorporated herein by reference.

BACKGROUND OF THE INVENTION

1. Technical Field

This disclosure relates in general to network computer systems, and more particularly to a method, apparatus and program storage device for providing mutual failover and load-balancing between interfaces in a network.

2. Description of the Prior Art

Computer systems linked to each other in a network are commonly used in businesses and other organizations. Computer system networks ("networks") provide a number of benefits for the user, such as increased productivity, flexibility, and convenience as well as resource sharing and allocation.

Networks are configured in different ways depending on implementation-specific details such as the hardware used and the physical location of the equipment, and also depending on the particular objectives of the network. In general, networks include one or more server computer systems, each communicatively coupled to numerous client computer systems.

As the use of networked computer systems increases, the need has arisen to provide additional bandwidth to handle the electronic traffic on the network. For example, inadequate bandwidth can result in data stalling in the pipeline between a client and a server. This stalling can significantly limit network performance.

Network interface cards (NIC) are used to connect a server or any computing device to a network. Such NICs include, for example, Ethernet cards or Token Ring cards that plug into a desktop computer or server. The NIC implements the physical layer signaling and the Media Access Control (MAC) for a computer attached to a network. Multiple NICs effectively attach a computer to a network multiple times. This increases the potential bandwidth into the network proportionally. Multiple NICs also provide resiliency and redundancy if one of the NICs fails. In the case of a failure of a NIC, one of the other NICs is used to handle the traffic previously handled by the failed NIC, thereby increasing overall system reliability. Accordingly, it is necessary to be able to detect when a NIC fails and, when a failed NIC is detected, to switch to a functioning NIC (this is referred to as fault tolerance and fail over support). NICs are typically represented in the host operating system through kernel objects referred to as "network interfaces." Herein, the network interfaces that are directly used by the Internet Protocol (IP) will be referred to as "IP interfaces." Furthermore, interfaces directly corresponding to the NICs will be referred to as the physical interfaces. Interfaces derived from physical interfaces, as described herein will be variously referred to as logical or virtual interfaces.

Load balancing is a technique used to reduce data bottlenecks caused by an overloaded communications network. In load balancing, the traffic between a server and a network is shared over multiple NICs. Such load balancing typically requires special software. Load balancing also provides fault tolerance, which maintains data communication between the server and the network in the event of a disruption in a data link. When a link fails, the load is failed over to a backup or secondary link such that signal continuity is maintained.

A well-known technique is to group multiple physical links together so that they appear as a single network interface to the Internet Protocol (IP) layer of the TCP/IP stack. The load balancing and failover are then implemented among the links without the IP layer being aware of it. Examples of such techniques are the 'bonding' driver in Linux, Etherchannel or IEEE 802.3ad link aggregation standard.

However, these techniques suffer from several disadvantages. For example, since the system considers the multiple physical links as a single NIC the load balancing is implemented below the IP layer. In other words, the multitude of NICs is presented as a single interface to the IP protocol. Therefore the network layer information, e.g. the routing table, cannot be used to load balance the data traffic. Generic tools that work at the network layer do not apply as well. These disadvantages also apply to the failover mode.

The link aggregation techniques described above further require specialized switches that can consider multiple switch ports as one; in the case of directly connected peer systems, both ends must be configured to support the standard. Furthermore, the failure of the switch causes all the links to loose connectivity. In an alternative mode, which supports failover only but not load balancing, the links may be connected to different switches, however in such a configuration, only one link can be active at a given time.

Load-balancing can also be provided at the IP layer wherein the load is balanced across multiple IP interfaces. The data is load balanced in accordance to the routing table entries, which point to a particular IP interface for a given route. On failure of a NIC an alternative method for failover must be implemented and the routing table updated which can take time. The link level fail over described earlier occurs within a short (millisecond) interval whereas route propagation can take much longer. In addition the IP address needs to be associated with the backup interface and failover MAC address informed to the peers. Therefore, a method is required that allows for load balancing at the IP layer while providing a fast failover.

It can be seen then that there is a need for a method, apparatus and program storage device for providing mutual failover and load balancing between interfaces at the IP layer in a network.

SUMMARY OF THE INVENTION

To overcome the limitations described above, and to overcome other limitations that will become apparent upon reading and understanding the present specification, the present invention discloses a method, apparatus and program storage device for providing mutual failover and load-balancing between interfaces in a network.

In one aspect of the invention, a device is provided for providing network connections for mutual failover and load sharing. An active virtual interface and a passive virtual interface are provided for each of a first and a second computer interface. A first virtual IP interface is coupled to the active virtual interface of the first computer interface with the passive virtual interface of the second interface, and a second virtual IP interface is coupled to the active virtual interface of the second computer interface with the passive virtual interface of the first computer interface. In addition, at least one access controller is coupled to the virtual interfaces to direct data flow to the at least first and second computer interface via the communicatively coupled virtual interfaces. Data flow is directed over the first and second active virtual interfaces when the first and second computer interfaces are available. Otherwise, data flow is directed to an active virtual interface and passive virtual interface of an available first or second interface when one of the first or second computer interface is unavailable.

In another aspect of the invention, a program storage device readable by a computer and tangibly embodying one or more programs of instructions executable by the computer to perform operations for supporting data flow at a first and second computer interface to provide mutual failover and load sharing is provided. The operations include providing an active virtual interface and a passive virtual interface for each of a first and a second computer interface. The active virtual interface of the first computer interface is communicatively coupled with the passive virtual interface of the second interface, and the active virtual interface of the second computer interface is communicatively coupled with the passive virtual interface of the first computer interface. Data flow is directed over each of the first computer interface active virtual interface and second computer interface active virtual interface without a routing update when the first and second computer interfaces are available. Otherwise, data flow is directed to the active virtual interface and passive virtual interface of an available first or second interface.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DESCRIPTION OF THE PREFERRED EMBODIMENT

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing mutual failover and load-balancing between interfaces in a network. The present invention joins active and passive virtual interfaces with cooperating computer interfaces to share bandwidth when all of the computer interfaces are operating, and to provide failover in the event of failure of one of the computer interfaces.

A single physical interface may be used to create a virtual interface. Two or more virtual interfaces may be joined to form a single interface that distributes or load-balances its packets across the joined virtual interfaces. In the context of this invention the term 'joined' or 'combination' is used to logically combine two virtual interfaces together, which may be used as a single IP interface. Herein, such joined virtual interfaces formed by a combination of one or more virtual interfaces are referred to as component interfaces. Through proper control, a component interfaces may transmit and receive its packets through the physical interfaces that it is derived from.

Figure 1:
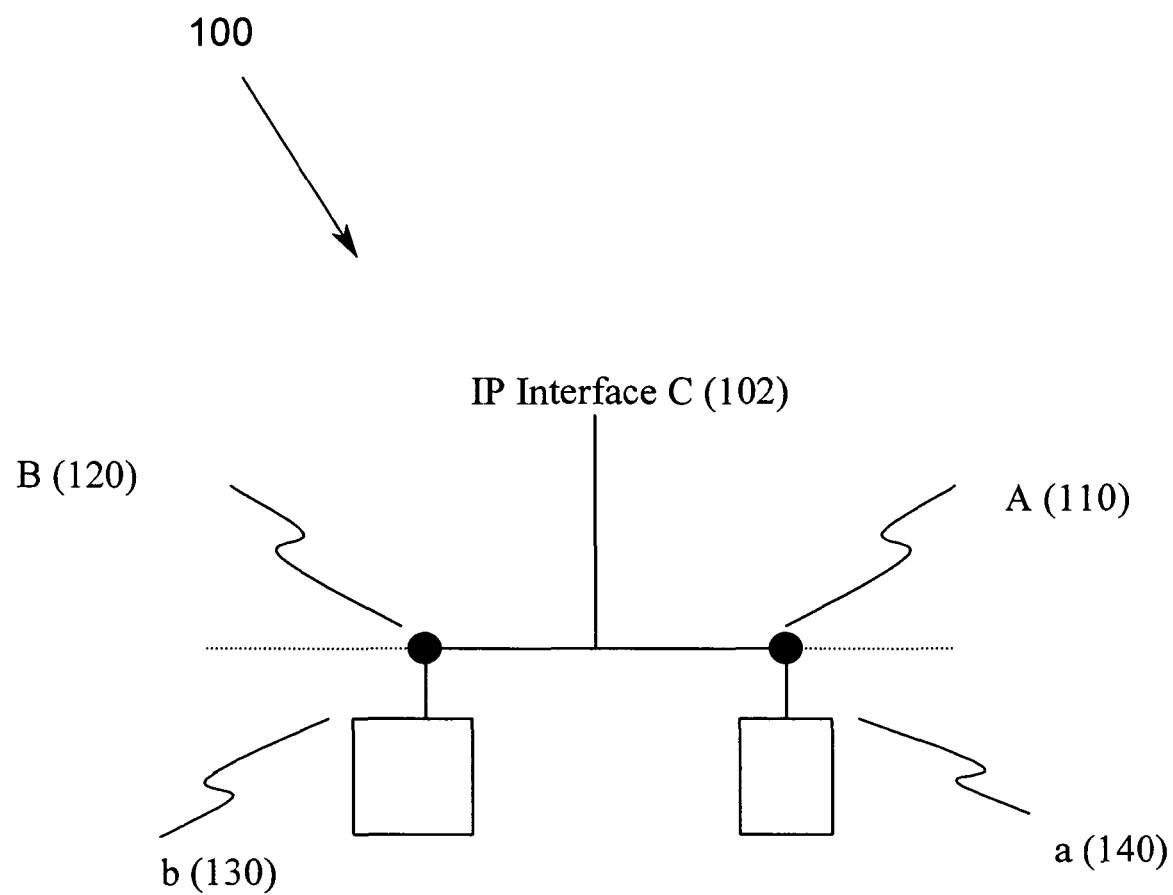
FIG. 1 illustrates a system network hierarchy depicting the state of the art.

FIG. 1 illustrates a system network hierarchy 100 depicting the state of the art. Failover and load-balancing mechanisms can be provided by setting devices in a combination formed from two physical interfaces. The hierarchy of FIG. 1 shows an IP interface C 100 that is formed from two NICs a 140 and b 130. These two NICs are represented in the operating system's network stack as physical interfaces A 110. All data being sent down IP interface C 100 may be load balanced across the two interfaces B 120 and A 110. The media independent interface (MII) signal failure is used to detect a NIC becoming non-functional. This detection and the failover are instantaneous (measured in milliseconds).

It must be understood that a combination might consist of multiple component interfaces and is not limited to two component interfaces B 120 and A 110 as shown in FIG. 1. Further, a combination of component interfaces, such as component interfaces B 120 and A 110, may be configured such that only one of the component interfaces, e.g., component interface A 110, is ever active whereas the other component interface(s), e.g., component interface B 120, act as passive backups. When a failure is detected on a first component interface A 110, backup interface(s), e.g., component interface B 120, maybe made active. In this configuration, each of the interfaces b 130 and a 140 are connected to separate switches. However, such a configuration wastes the resources of the passive backup, which is kept idle.

The present invention presents a method for providing mutual backup among the interfaces thereby preventing the idling of any resource. As described, fast failover (e.g., in milliseconds) may be provided by the use of the MII detection at the device. As will be shown, an embodiment of the present invention continues to leverage such fast failover based on MII monitoring because the passive component interface on the functioning physical interface is made active immediately on detecting an interface failure.

In link aggregation implementations such as, trunking, channel bonding, or IEEE's 802.3ad standard, multiple links appear as a single IP interface while providing data load balancing and failover across the links. In link aggregation configurations, multiple network links appear as a single link with a single logical network interface appearing as the IP interface, and have one virtual media access control (MAC) address. The MAC address of one of the interfaces belonging to the aggregated link provides the virtual address of the logical link. In typical link aggregation configurations, the data is balanced across the physical links based on rudimentary algorithms such as round robin, logical exclusive-or operation on the source and destination MAC address etc. Since multiple links on different switch ports are considered part of the same logical link specialized switches are needed that are able to consider a group of ports as a single port and load balance traffic across them.

Figure 2A:
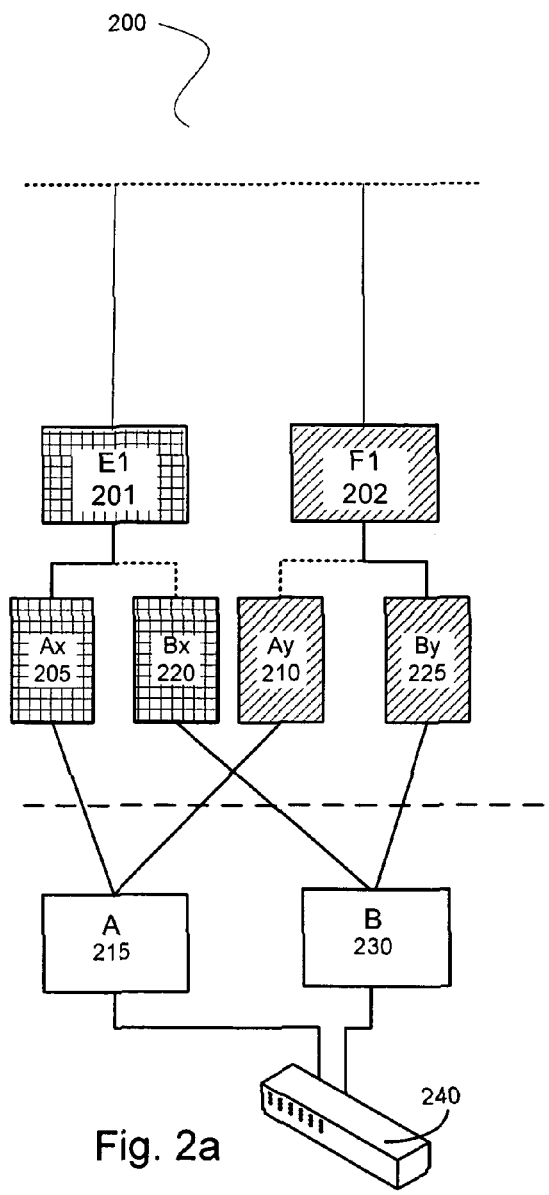
FIG. 2a is an illustration of a network with two interfaces A and B for providing failover and load balancing according to an embodiment of the present invention.

FIG. 2a is an illustration of a network 200 with two interfaces A 215 and B 230 for providing failover and load balancing according to an embodiment of the present invention. Interfaces A 215 and B 230 are each partitioned into two components, e.g., A 215 is partitioned into Ax 205 and Ay 210, and B 230 is partitioned into Bx 220 and By 225. Interfaces A 215 and B 230 correspond to component interfaces A 110 and B 120 in FIG. 1. IP interfaces E1 201 and F1 202 are formed. E1 201 is formed by joining virtual interface Ax 205 and Bx 220. F1 202 is formed by joining virtual interfaces Ay 210 and By 225. Each combination E1 201 and F1 202 supports an active component and passive component interface. Thus, Ax 205 is the active component and Bx 220 is the passive component for interface E1 201. By 225 is the active component and Ay 210 is the passive component for interface F1 202.

If one of the physical interfaces A 215 or B 230 becomes unavailable, the component interfaces can redirect data flow to the operational physical interface via the component interfaces associated with the operational physical interface. As a result, the two interfaces A 215 and B 230 may remain active, serve as backup for one another and/or share data packets across the two interfaces. Load balancing can operate under normal operating conditions when both interfaces are active. Data sent on the combination interface E1 201 will flow through Ax 205, on physical interface A 215.

Similarly, under normal conditions data sent on combination interface F1 202 will flow through By 225, on physical interface B 230. Each interface connects to a common OSI layer 2 destination, such as a switch 240. Combination interfaces E1 201 and F1 202 are used as IP interfaces. With the use of network layer techniques, such as equal path routing, policy based routing or other load-balancing techniques the network load can be balanced across interfaces E1 201 and F1 202 while fully utilizing the physical bandwidth offered by both the interfaces A 215 and B 230. As described, the data actually flow through the active component of the combination and then finally through the physical interface. The total throughput across the interfaces is therefore maximized while providing mutual backup against interface failure while providing network level control of load balancing.

Figure 2B:
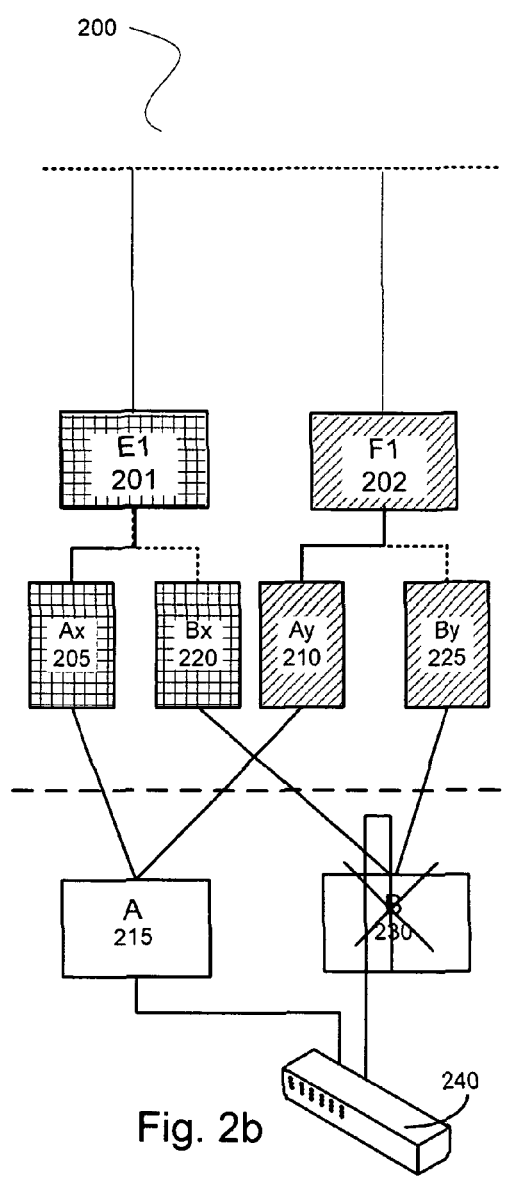
FIG. 2b illustrates the network of FIG. 2a in failover mode.

FIG. 2b illustrates the network 200 of FIG. 2a when one of the physical interfaces B 230 fails. When either interface A 215 or interface B 230 is unavailable, failover is initiated and the available interface will take the load for both the A 215 and B 230 interfaces. As illustrated in FIG. 2a, the active component of Ax 205 of the active interface A 215 functions normally receiving data packets through E1201. The passive component Ay 210 of the active interface A 215, however, receives data packets originally intended for unavailable interface B 230 via combination interface F1 202 which redirects data packets to Ay 210 rather than to By 225. This failover is undetected by the IP layer, which continues to function as before. Thereby, a fast failover is instrumented without disrupting IP load balancing. Since on the failure of the physical interfaces, A 215 or B 230, the IP interfaces E1 201 and F1 202 stay unaffected, there are no routing updates required. The IP layer therefore can be used to load balance across the two interfaces utilizing equal path or policy based routing, or utilizing various network level tools.

There must be continued communication with the router/peers whose packets were received through the failed NIC. Three methods for maintaining communication upon NIC failure, for example, will be described herein. Network interface cards (NICs) that support multiple MAC addresses simultaneously are used. The same set of MAC address are assigned to all the physical interfaces that finally form a combination, e.g., interfaces A 215 and B 230. Each MAC address is associated with an individual IP address used at the IP interfaces, E1 201 or F1 202. The MAC address of the outgoing packets is chosen based on the source IP address. By default there is only one component that is active on a given physical interface, i.e., e.g., component Ax 205 while Ay 210 is passive on interface A 215. This is the component interface through which the data is normally transmitted from the IP interface. Therefore, every physical interface, e.g., interfaces A 215 and B 230, assigns the MAC address corresponding to the active component as its primary MAC and advertises it to the switch 240 by a suitable mechanism. At startup the physical interface is configured to filter away all packets with a destination MAC address not equal to the physical interface's primary MAC address. Normal communication between the IP nodes ensures that the switch tables are updated with the MAC addresses associated with its ports.

A method of communicating the MAC address to the switch 240 connected to the interfaces A 215 and B 230 on failover is by transmitting an Ethernet frame with the source set to primary MAC of the failed NIC and destination MAC set to the primary MAC of the active NIC interface. The transmitted frame's payload meets the Ethernet protocol requirements, but the data is all zeroes. The switch 240 in this embodiment will update its tables to indicate the location of the MAC on the receiving port. The frame's "Ethertype" value should be set to a value that is not supported on the system or a special value may be requested from Internet Assigned Number Authority (IANA) so that the packet if sent back to the NIC is filtered away by the driver. In this embodiment of the present invention, upon fail over, the MAC address associated with the IP address moves to the functioning NIC without having to inform all the IP clients/peers of the fail over. The functioning NIC is suitably configured to accept packets on the failed over MAC address as well.

The packets in a local area network (LAN) are transmitted to the interfaces' MAC address. IP implements address resolution techniques to determine the MAC address corresponding to the peer's IP address. Address resolution response, through Address Resolution Protocol or Neighbor Discovery, to any particular IP address always returns the primary MAC of the physical interface associated with the active component of the IP interface it is bound to, e.g., IP interface E1 201 returns the primary MAC address of A 215. When an interface fails, the passive component of the functioning physical interface, A 215 or B 230, is made active through software control. In addition an Ethernet frame as described above is transmitted on the physical interface with the primary MAC of the failed physical interface.

Another method may be used for maintaining communication upon failure of a NIC does when multiple MACs per NIC are not supported. In this method, a gratuitous ARP may be transmitted to advertise that the IP address is now associated with the functioning NIC's MAC address.

Still further, a third method may be used for maintaining communication upon failure of a NIC when the NICs do not support multiple MAC entries. In the receiving IP node in the same network, separate multicast MAC values may be assigned to the physical NICs as their MAC addresses because a check of whether the source MAC address in the received Ethernet frame is a multicast address. On failover, the failed NIC's multicast MAC address may be added to the multicast list on the active interface. Thereby all packets received on that multicast address will be received by the NIC.

Figure 3:
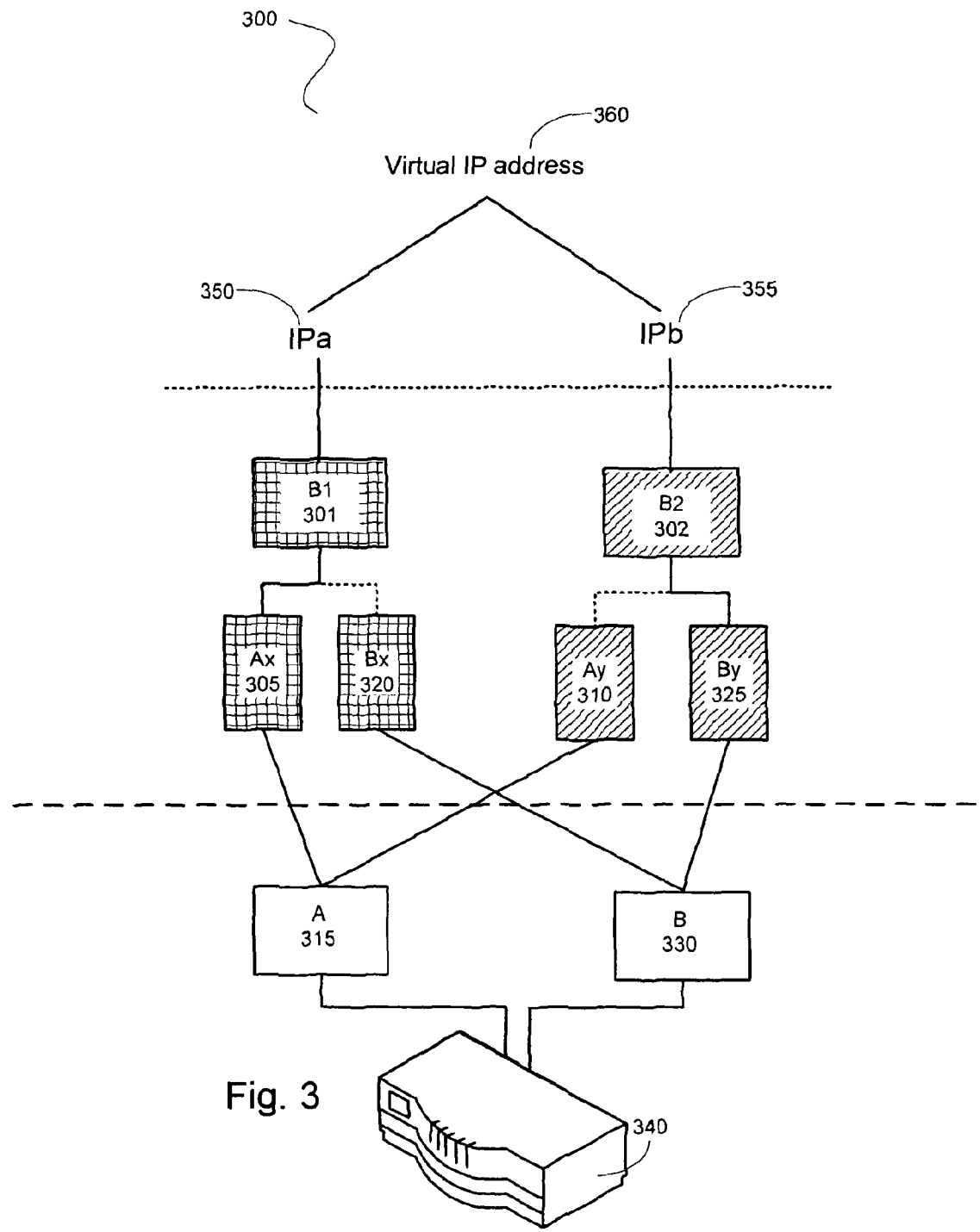
FIG. 3 illustrates governing network interface access control using virtual IP addresses in accordance with an embodiment of the present invention.

FIG. 3 illustrates governing network interface access control using virtual IP addresses 360 in accordance with an embodiment 300 of the present invention. A virtual IP address is an address that is not associated with a physical IP interface but rather is a logical address that may be mapped logically to a physical IP address. Since such an address is immune from the state of the physical interfaces, such as the interface being marked down, it will always be present. Such IP addresses may be configured as being on a network that appears to be reachable only through the virtual combination interfaces B1 301 and B2 302. With this setup all communication to and from the system can use the virtual IP address; but the data can itself be load balanced across the IP routes associated with B1 301 and B2 302. This type of control occurs at the network layer, i.e., layer 3, and provides failover and load balancing without requiring specialized hardware, thereby providing better control than a link-aggregation solution. IP address 360 provides IP routing (for example, equal path) via two IP addresses, IPa 350 and IPb 355, coupled to interfaces A 315 and B 330 via virtual interfaces B1 301 and B2 302 and virtual interfaces Ax 305, Ay 310, Bx 320 and By 325, to provide load-balancing between the two physical interfaces A 315 and B 330. Interfaces A 315 and B 330 are communicatively coupled to a network device 340, which may comprise a switch or another IP node. When an interface becomes inactive, failure is detected using MII monitoring and the passive component in the combination IP interface is made active. The failure detection results in a gratuitous ARP or Ethernet frame to inform the switch of the packets from the same IP address flowing across a different port. However, the routing table entries including the ones at other routers in the network do not require any modification since none of the IP interfaces are affected. For example, if interface A 315 fails, virtual interface Bx 320, which was passive, becomes active and a gratuitous ARP or Ethernet frame is used to inform the switch 340 that packets from the same IP address, i.e., IPa 350, is now being received at the port connected to interface B 330.

It must be understood by those skilled in the art that the invention may be extended to multiple NICs providing load balancing and mutual backup for failover to one another. For example, each NIC can contribute a number N of component interfaces. Every IP interface is formed using one virtual component interface from each NIC with only one of the components being active. The other component interfaces are passive. On failure of a NIC, the IP interface with an active component from the NIC will failover to one of the other component interfaces associated with a NIC that is still active. An embodiment of the present invention may be further extended to include a pool of backup component interfaces, which are joined in a combination interface only when the active component interface of the IP interface fails.

Figure 4:
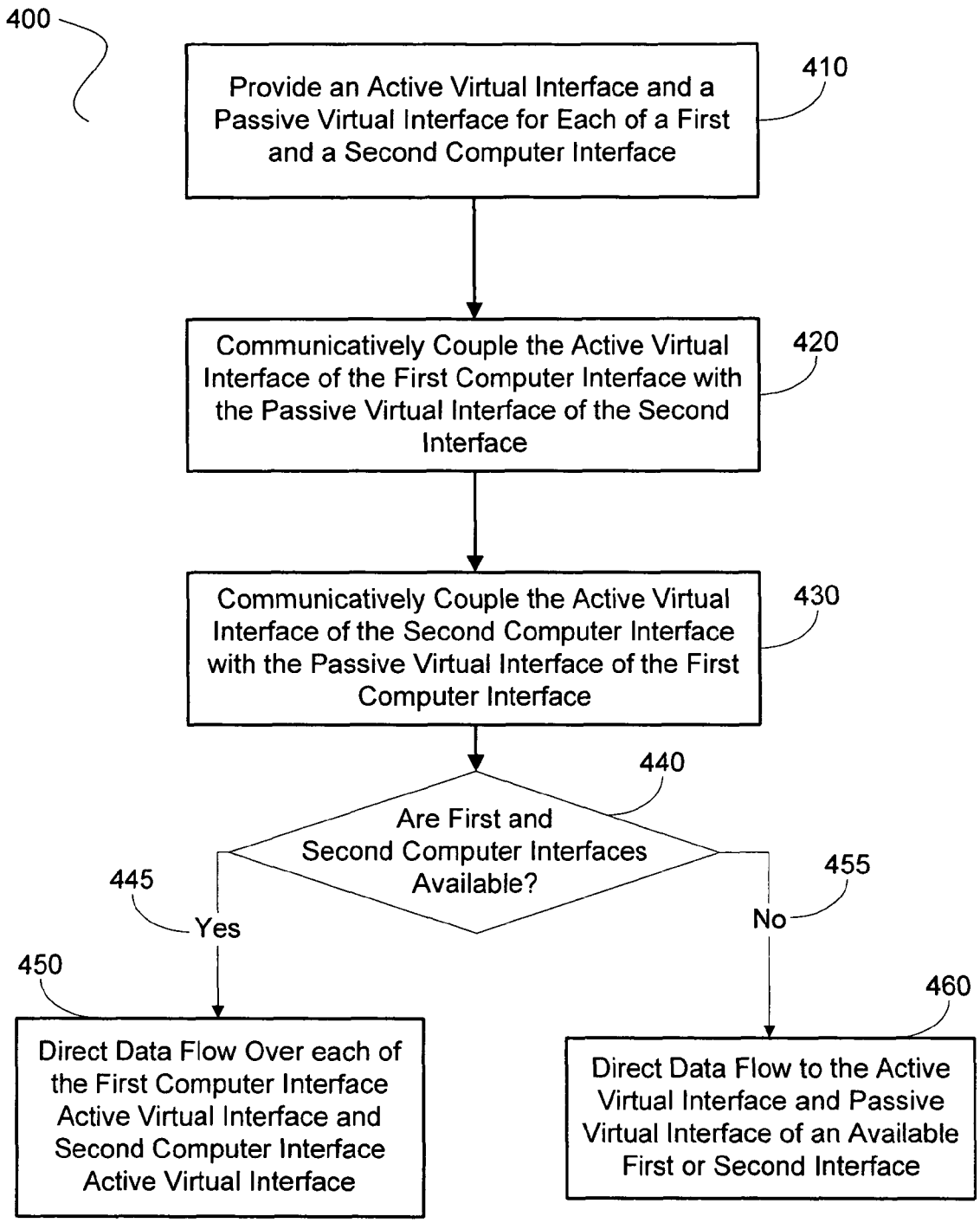
FIG. 4 illustrates a method for providing network connections for mutual failover and load sharing in accordance with an embodiment of the present invention.

FIG. 4 illustrates a method 400 for providing network connections for mutual failover and load sharing in accordance with an embodiment of the present invention. According to the method, an active virtual interface and a passive virtual interface are provided 410 for each of a first and a second computer interface. The active virtual interface of the first computer interface and the passive virtual interface of the second computer interface are communicatively coupled 420. The active virtual interface of the second computer interface and the passive virtual interface of the first computer interface are communicatively coupled 430. A determination 440 is made as to whether the first and second computer interfaces are available. When available 445, data flow is then directed 450 over each of the first computer interface active virtual interface and second computer interface active virtual interface. Otherwise, when one of the first and second computer interfaces are unavailable 455, data flow is then directed 460 to the active virtual interface and passive virtual interface of the available first or second interface.

Figure 5:
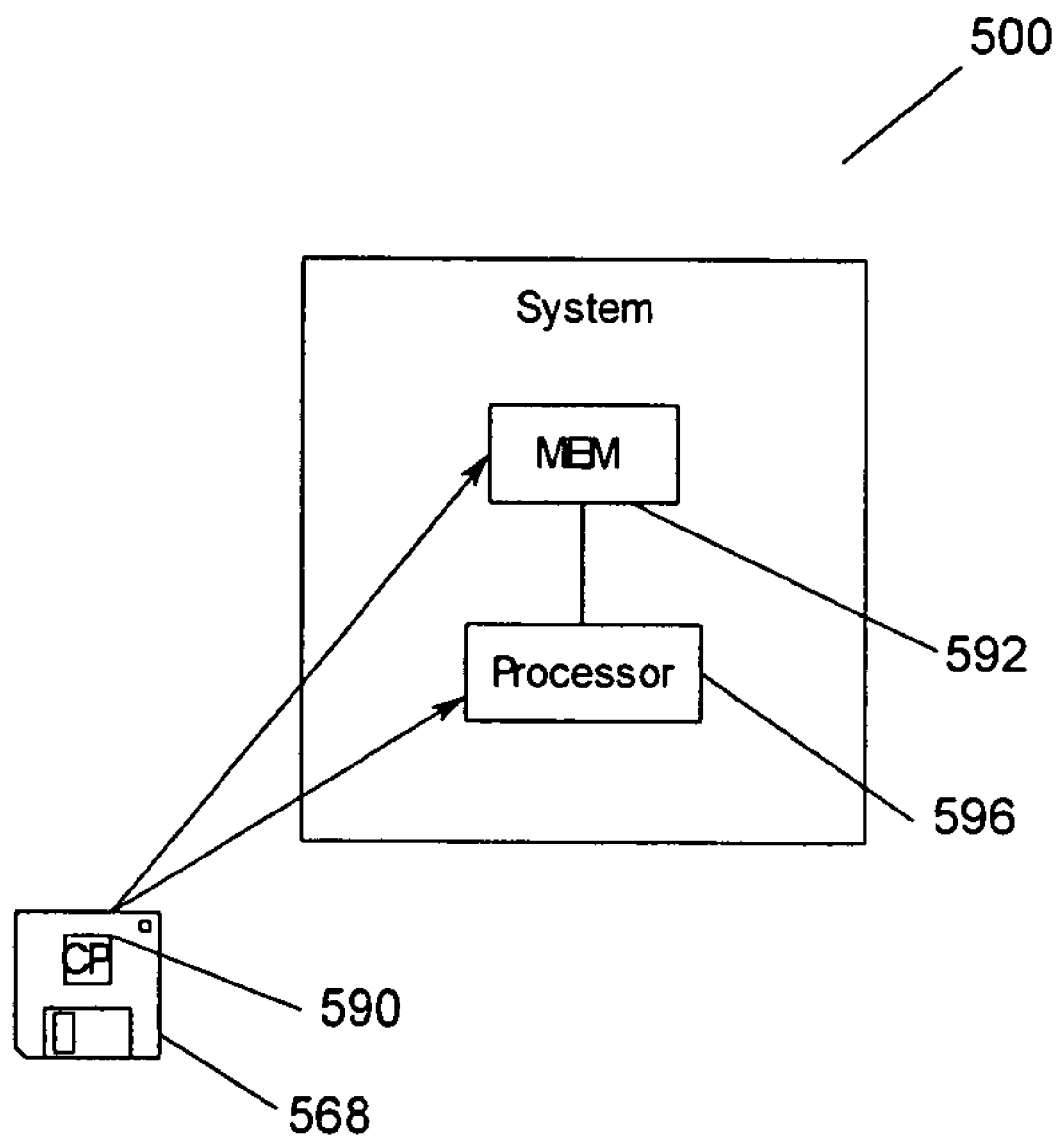
FIG. 5 illustrates a system for performing operations for supporting data flow at a first and second computer interface to provide mutual failover and load sharing according to an embodiment of the present invention.

FIG. 5 illustrates a system 500 according to the present invention, wherein the process illustrated with reference to FIGS. 1-3 may be tangibly embodied in a computer-readable medium or carrier, e.g., one or more of the fixed and/or removable data storage devices 568 illustrated in FIG. 5, or other data storage or data communications devices. A computer program 590 expressing the processes embodied on the removable data storage devices 568 may be loaded into the memory 592 or into the controller system 500, e.g., in a processor 510, to configure the controller system 500 of FIG. 5, for execution. The computer program 590 comprise instructions which, when read and executed by the controller 500 of FIG. 5, causes the controller system 500 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A device for providing network connections for mutual failover and load sharing comprising:
   an active virtual interface and a passive virtual interface for each of a first and a second computer interface;
   a first IP address assigned to the first computer interface via coupled to the active and passive virtual interfaces of the second interface;
   a second IP address assigned to the second computer interface via the active and passive virtual interfaces; and
   a virtual IP address providing IP routing via the first and second IP addresses to direct data flow to the at least first and second computer interface via the communicatively coupled virtual interfaces, data flow being directed over the first and second active virtual interfaces when the first and second computer interfaces are available, else directing data flow to an active virtual interface and passive virtual interface of an available first or second interface when one of the first or second computer interface is unavailable.

2. The device of claim 1, further comprising a switch coupled to the at least first and second computer interface, the switch being configured to handle Ethernet frames meant for the same source and destination.

3. The device of claim 1, wherein the first and second computer interfaces comprise at least two network interface cards.

4. The device of claim 3, wherein each network interface card supports multiple MAC addresses simultaneously.

5. The device of claim 1, wherein the computer interface is configured to transmit a frame for providing failover.

6. The device of claim 5, wherein the frame communicates a source set to a primary MAC of a failed NIC and a destination MAC set to a primary MAC of an active NIC interface.

7. The device of claim 1, wherein the first active virtual interface and the second passive virtual interface form a first component interface and the second active virtual interface and the first passive virtual interface form a second component interface.

8. The device of claim 1, wherein an access controller determines the availability of the at least first and second computer interface by sending a gratuitous address resolution protocol (ARP).

9. The device of claim 1, wherein at least a portion of the virtual interfaces is selected from a pool of virtual interfaces.

10. The device of claim 1, wherein an access controller assigns a virtual internet protocol addresses to each of the at least first and second interface and routes the data flow using internet protocol routing.

11. The device of claim 1, wherein separate multicast MAC values are assigned to the first and second physical computer interfaces as corresponding MAC addresses and, on failover, the multicast MAC address of a failed computer interface is added to a multicast list on the remaining computer interface to ensure all packets received having the multicast MAC address of a failed computer interface are received by the remaining computer interface.

12. A program storage device readable by a computer, the program storage device tangibly embodying one or more programs of instructions executable by the computer to perform operations for supporting data flow at a first and second computer interface to provide mutual failover and load sharing, the operations comprising:
   providing an active virtual interface and a passive virtual interface for each of a first and a second computer interface;
   communicatively coupling the active virtual interface of the first computer interface with the passive virtual interface of the second interface;
   communicatively coupling the active virtual interface of the second computer interface with the passive virtual interface of the first computer interface;
   assigning first and second IP addresses to the first and second computer interfaces, respectively, via the active and passive virtual interfaces; and
   providing a virtual IP address for IP routing via the first and second IP addresses to direct data flow over each of the first computer interface active virtual interface and second computer interface active virtual interface absent a routing update when the first and second computer interfaces are available, else directing data flow to the active virtual interface and passive virtual interface of an available first or second interface, wherein the virtual interfaces are not affected by failure of one of said computer interfaces.

13. The program storage device of claim 12, further comprising sending a gratuitous address resolution protocol for determining the availability of one of the first and second interfaces.

14. The program storage device of claim 12, wherein directing data flow comprises directing data flow using an active virtual interface and a passive virtual interface of the first and second computer interface, wherein at least a portion of the virtual interfaces are selected from a pool of virtual interfaces.

15. The program storage device of claim 12, wherein the providing an active virtual interface and a passive virtual interface for each of a first and a second computer interface further comprises providing the first and second computer interfaces with at least two network interface cards.

16. The program storage device of claim 15, wherein the providing the first and second computer interfaces with at least two network interface cards further comprises providing support for multiple MAC addresses simultaneously.

17. The program storage device of claim 12, further comprising configuring a computer interface to transmit a frame for providing failover, including using the frame to communicate a source set to a primary MAC of a failed NIC and a destination MAC set to a primary MAC of an active NIC interface.

18. The program storage device of claim 12, wherein directing data flow comprises: assigning a virtual Internet Protocol addresses to each of the at least first and second interface; and routing the data flow using Internet Protocol routing.

19. The program storage device of claim 12, wherein the providing an active virtual interface and a passive virtual interface for each of a first and a second computer interface further comprises forming a first component interface using the first active virtual interface and the second passive virtual interface and forming a second component interface using the second active virtual interface and the first passive virtual interface.

20. The program storage device of claim 12, wherein the directing data flow further comprises assigning separate multicast MAC values to the first and second physical computer interfaces as corresponding MAC addresses and, on failover, adding the multicast MAC address of a failed computer interface to a multicast list on the remaining computer interface to ensure all packets received having the multicast MAC address of a failed computer interface are received by the remaining computer interface.

* * * * *